(12) United States Patent
Williams et al.

(10) Patent No.: US 11,070,473 B2
(45) Date of Patent: *Jul. 20, 2021

(54) VIRTUAL PRIVATE NETWORK (VPN)-AS-A-SERVICE WITH LOAD-BALANCED TUNNEL ENDPOINTS

(71) Applicant: Akamai Technologies, Inc., Cambridge, MA (US)

(72) Inventors: Brandon O. Williams, Revere, MA (US); Martin K. Lohner, Cambridge, MA (US); Gowtham Boddapati, Belmont, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,526

(22) Filed: Nov. 3, 2017

(65) Prior Publication Data

US 2018/0069797 A1     Mar. 8, 2018

Related U.S. Application Data

(63) Continuation of application No. 14/559,745, filed on Dec. 3, 2014, now Pat. No. 9,813,343.

(60) Provisional application No. 61/911,117, filed on Dec. 3, 2013.

(51) Int. Cl.
*H04L 12/803*   (2013.01)
*H04L 29/06*    (2006.01)
*H04L 29/08*    (2006.01)
*H04L 12/46*    (2006.01)

(52) U.S. Cl.
CPC ........ *H04L 47/125* (2013.01); *H04L 12/4633* (2013.01); *H04L 63/0272* (2013.01); *H04L 67/1023* (2013.01); *H04L 63/164* (2013.01)

(58) Field of Classification Search
CPC combination set(s) only.
See application file for complete search history.

(56) References Cited

U.S. PATENT DOCUMENTS

| | | | |
|---|---|---|---|
| 6,738,910 B1 | 5/2004 | Genty et al. | |
| 8,671,273 B2 | 3/2014 | Roy-chowdhury et al. | |
| 2002/0138623 A1 | 9/2002 | Gruber et al. | |
| 2003/0058274 A1 | 3/2003 | Hill et al. | |

(Continued)

*Primary Examiner* — Yee F Lam
(74) *Attorney, Agent, or Firm* — David H. Judson

(57) ABSTRACT

A mechanism to facilitate a private network (VPN)-as-a-service, preferably within the context of an overlay IP routing mechanism implemented within an overlay network. The overlay provides delivery of packets end-to-end between overlay network appliances positioned at the endpoints. During such delivery, the appliances are configured such that the data portion of each packet has a distinct encryption context from the encryption context of the TCP/IP portion of the packet. By establishing and maintaining these distinct encryption contexts, the overlay network can decrypt and access the TCP/IP flow. This enables the overlay network provider to apply one or more TCP optimizations. At the same time, the separate encryption contexts ensure the data portion of each packet is never available in the clear at any point during transport. According to another feature, data flows within the overlay directed to a particular edge region may be load-balanced while still preserving IPsec replay protection.

10 Claims, 15 Drawing Sheets

(56) References Cited

U.S. PATENT DOCUMENTS

| | | |
|---|---|---|
| 2004/0003116 A1 | 1/2004 | Munger et al. |
| 2004/0258078 A1* | 12/2004 | Shieh ................ H04L 45/00 370/395.42 |
| 2006/0227811 A1* | 10/2006 | Hussain .............. H04L 49/90 370/503 |
| 2008/0095368 A1 | 4/2008 | Iida et al. |
| 2008/0307519 A1 | 12/2008 | Curcio et al. |
| 2009/0172184 A1* | 7/2009 | Wason ................ H04L 47/14 709/234 |
| 2010/0077204 A1 | 3/2010 | Kawano |
| 2012/0230345 A1* | 9/2012 | Ovsiannikov ........ H04L 47/22 370/412 |
| 2014/0181319 A1* | 6/2014 | Chen .................. H04L 69/12 709/234 |
| 2014/0223170 A1 | 8/2014 | Reynolds et al. |
| 2015/0067819 A1* | 3/2015 | Shribman .......... H04L 67/2838 726/12 |
| 2015/0304282 A1 | 10/2015 | Xu et al. |
| 2015/0381503 A1 | 12/2015 | Visser et al. |
| 2015/0381773 A1 | 12/2015 | Visser |
| 2016/0080502 A1* | 3/2016 | Yadav ................ H04L 47/22 709/227 |
| 2016/0135074 A1* | 5/2016 | Welin ................ H04L 63/0272 370/235 |
| 2016/0261557 A1 | 9/2016 | Herrero et al. |
| 2016/0261559 A1 | 9/2016 | Herrero et al. |
| 2016/0269285 A1 | 9/2016 | Herrero et al. |

\* cited by examiner

VIRTUAL PRIVATE NETWORK (VPN)-AS-A-SERVICE WITH LOAD-BALANCED TUNNEL ENDPOINTS

BACKGROUND

Technical Field

This application relates generally to overlay network routing over the publicly-routed Internet.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

A wide area network (WAN) is a telecommunications network e.g., with links across metropolitan, regional, national or international boundaries, that covers a broad geographical area, typically using leased telecommunication lines. Enterprises and government entities utilize WANs to relay data among employees, clients, buyers, and suppliers from various geographical locations. For example, a WAN commonly is used to connect local area networks (LANs) and other types of networks together, so that users and computers in one location can communicate with users and computers in other locations. Many WANs are built for one particular organization and are private. Other types of WANs include those built by Internet service providers, and these can be used to provide connections from an organization's LAN to the Internet. When a WAN is built using leased lines, a router positioned at each end of the leased line connects the LANs on each side to each other.

One common WAN approach using leased lines implements Multi-Protocol Label Switching (MPLS). MPLS is a standard-based technology for speeding up network traffic flow. In MPLS, a specific path (identified by a label) is set up for a given packet sequence, thereby obviating router look-up of a next address to which to forward the packet. MPLS works with various types of network protocols, such as IP, ATM and frame relay. While delivery over MPLS is efficient and secure, it also is expensive, primarily due to the cost of the leased line. As an alternative, WANs also can be built using less costly packet switching methods such as those that can take full advantage of the Internet's packet-switched network.

Indeed, enterprises now desire to effectively utilize Internet links as an optimized wide area network (WAN), connecting branches, data centers, teleworkers and mobile users to applications over the Internet. Driven also by the impact of cloud computing and mobility, enterprises need a network service that can deliver an optimal and predictable cloud experience to users, preferably a network that is low-cost, easy-on, and global with security and optimization built-in.

BRIEF SUMMARY

This disclosure provides various mechanisms to facilitate a virtual private network (VPN)-as-a-service (or more generally, "network-as-a-service"), preferably within the context of an overlay IP (OIP) routing mechanism that is implemented within an overlay (or "content delivery") network ("CDN"). The notion of networking "as a service" enables enterprises to effectively utilize Internet links as an optimized wide area network (WAN), connecting branches, data centers, teleworkers and mobile users to applications over the Internet.

In this approach, it is assumed that a network-as-a-service customer operates endpoints (e.g., local area networks (LANs)) that are desired to be connected to one another securely and privately using the overlay IP (OIP) routing mechanism. The overlay provides delivery of packets end-to-end between overlay network appliances positioned at the endpoints. During such delivery, however, the appliances are configured such that the data portion of each packet has a distinct encryption context from the encryption context of the TCP/IP portion of the packet. By establishing and maintaining these distinct encryption contexts, the overlay network can decrypt and access the TCP/IP flow. This enables the overlay network provider to apply one or more TCP optimizations to the TCP flows. At the same time, however, the separate encryption context used for the data flow ensures that the data portion of each packet is never available in the clear at any point during the transport across the overlay.

This approach is highly advantageous as it allows overlay network customer data traffic between the endpoints to leverage and take advantage of all of the TCP and routing optimizations that are provided by the overlay network routing mechanism, at the same time obviating (in whole or in part) conventional transport mechanisms (such as MPLS) and their associated high cost. By establishing and enforcing the separate encryption contexts for the data (on the one hand), and the packet headers (on the other), the customer's data is protected from being accessed unencrypted as it traverses the public Internet (on which the overlay is built and runs). The overlay may also implement additional authentication and encryption protections to prevent discovery (e.g., from packets that traverse the public Internet) of details about the customer's internal network, and otherwise to prevent unauthorized access to the overlay network either for gaining access to a customer's internal network, or to gain optimized Internet transport and routing.

According to another feature, data flows within the overlay directed to a particular edge region may be load-balanced while still preserving IPsec replay protection.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
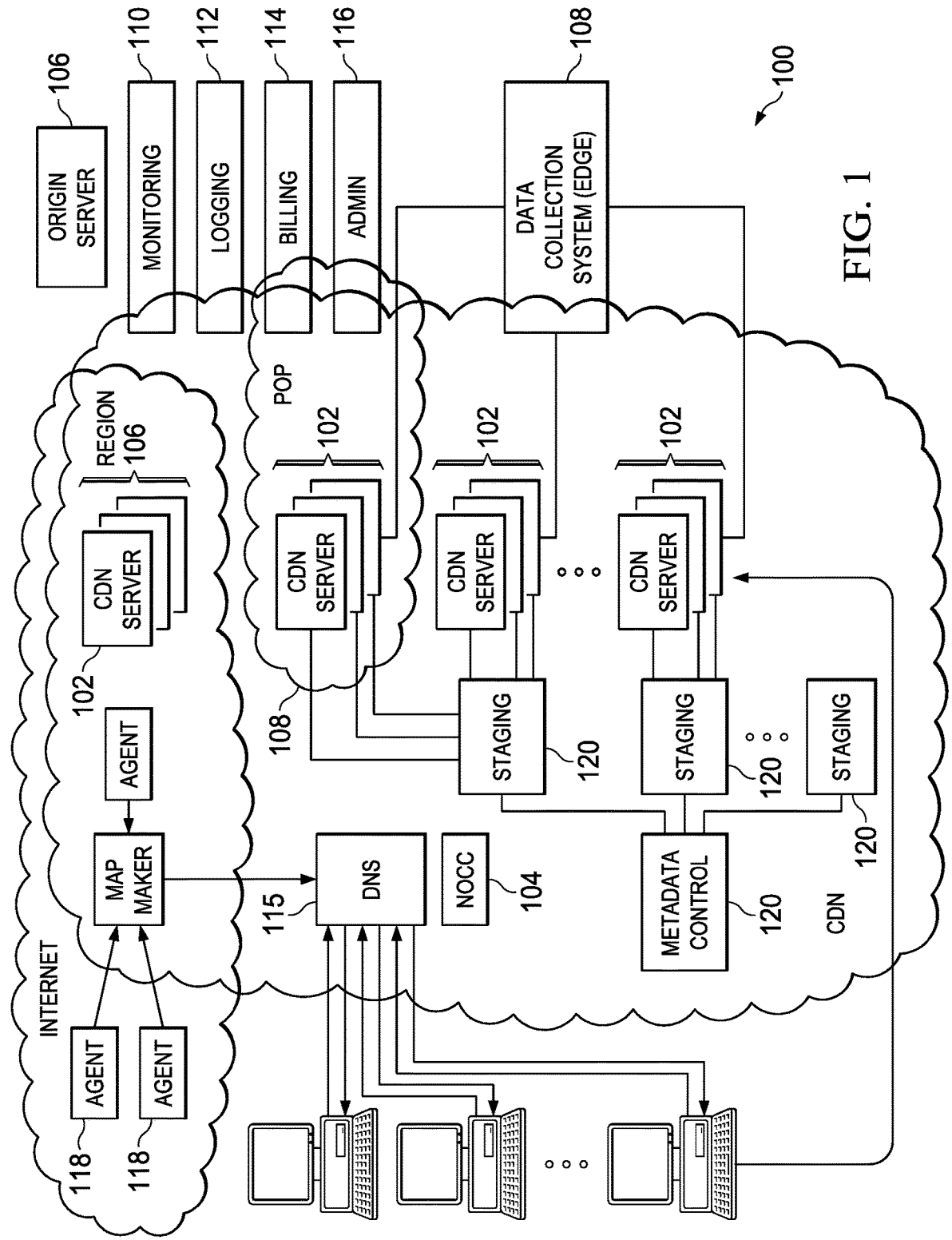
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
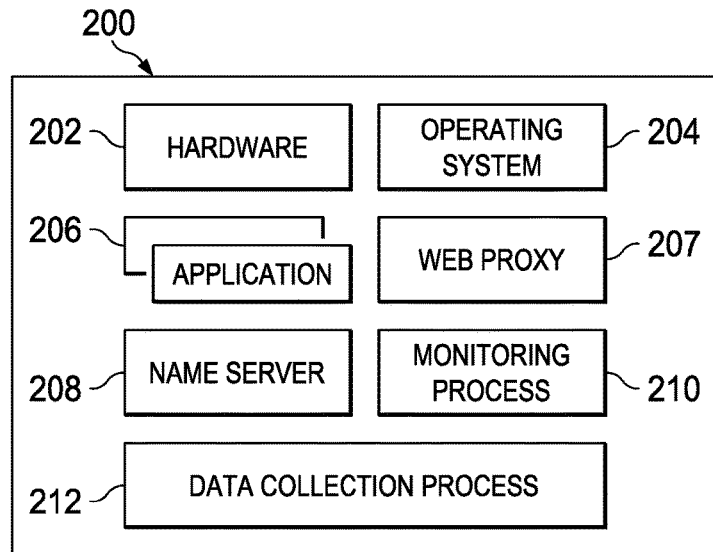
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419.

Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

By way of further background, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud. To accomplish these two use cases, CDN software may execute on virtual machines hosted in one or more customer data centers, and on virtual machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities. This type of managed solution provides an enterprise with the opportunity to take advantage of CDN technologies with respect to their Company's intranet.

As an overlay, the CDN resources such as described above also may be used to facilitate wide area network (WAN) acceleration services between enterprise data centers (which may be privately-managed) and third party software-as-a-service (SaaS) providers. The following provides additional details regarding this type of solution.

Figure 3:
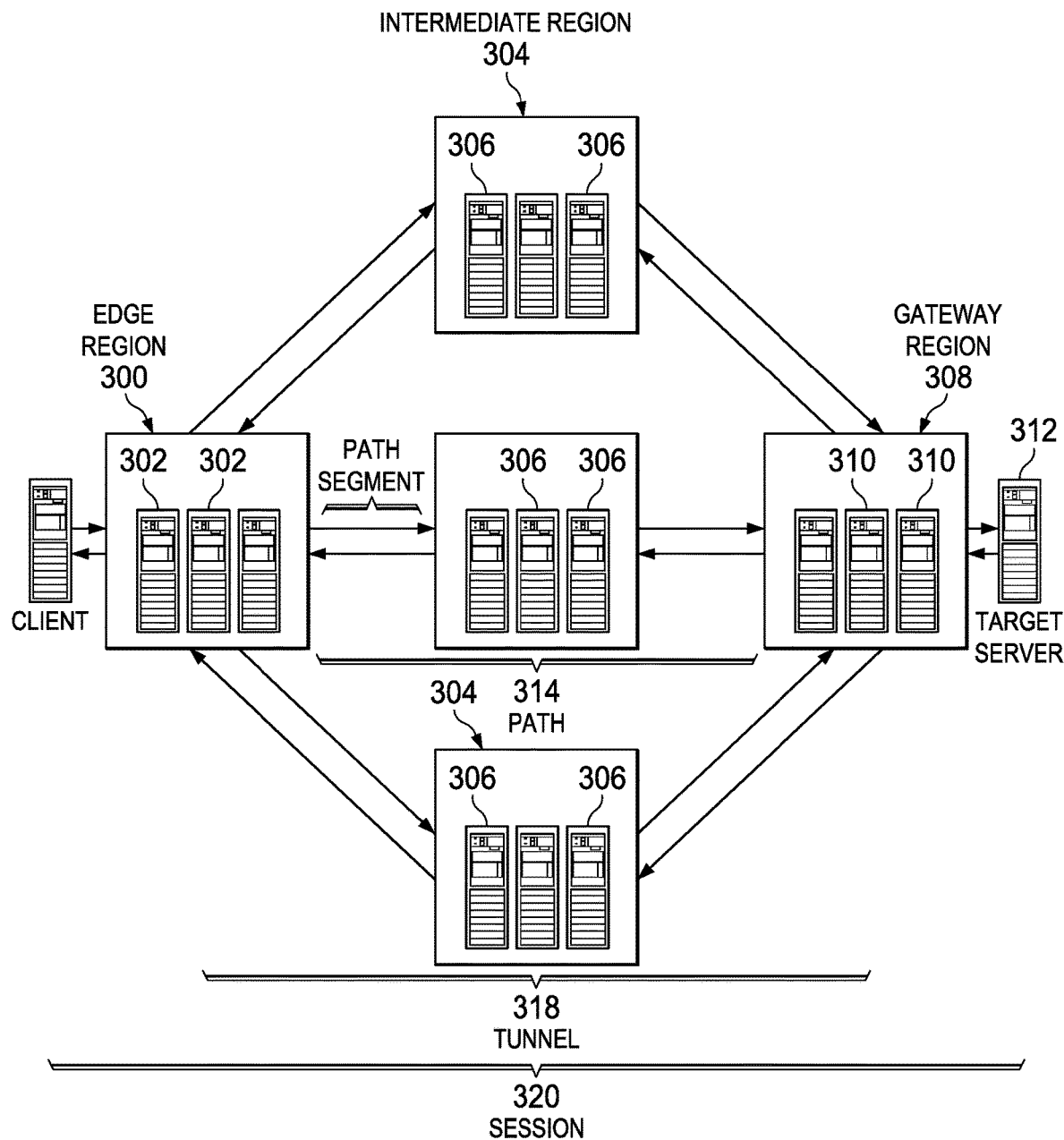
FIG. 3 is a known overlay solution whereby an overlay is positioned on top of the publicly-routable Internet.

In particular, FIG. 3 illustrates a known "overlay" network solution whereby an "overlay" is positioned on top of the publicly-routable Internet. This architecture is sometimes referred to as a "routing overlay" or "routing overlay network." The routing overlay network may leverage existing content delivery network (CDN) infrastructure, such as the infrastructure shown in FIGS. 1-2 above, and as provided by commercial services providers such as Akamai Technologies, Inc. of Cambridge, Mass. An overlay network of this type provides significant performance enhancements for any application that uses Internet Protocol (IP) as a transport protocol by routing around down links or finding a path with a smallest latency. As is well known, the Internet Protocol (IP) works by exchanging groups of information called packets, which are short sequences of bytes comprising a header and a body. The header describes the packet's destination, which Internet routers use to pass the packet along until it arrives at its final destination. The body contains the application data. Typically, IP packets travel over Transmission Control Protocol (TCP), which provides reliable in-order delivery of a stream of bytes. TCP rearranges out-of-order packets, minimizes network congestion, and re-transmits discarded packets.

Many of the machines in the overlay are servers located near the edge of the Internet, i.e., at or adjacent end user access networks. As has been described above, e.g., FIG. 1, third party web sites and application providers offload delivery of content and applications to the network, which operates as a managed service. The overlay network includes distributed infrastructure for data collection, monitoring, logging, alerts, billing, management and other operational and administrative functions. As has been described and as shown in FIG. 2, a typical CDN machine comprises commodity hardware (e.g., an Intel® Pentium® processor) running an operating system kernel (such as Linux™ or variant) that supports one or more applications. To facilitate content delivery services, for example, given machines typically run a set of applications, such as an HTTP Web proxy, a name server, a local monitoring process, and one or more data collection processes. The Web proxy includes or has associated therewith an edge server manager process to facilitate one or more functions associated with the content delivery network.

A known OIP routing mechanism comprises a representative set of components, as illustrated in FIG. 3:
  edge server 302—typically, a CDN edge server running an OIP edge server software process (oidp) as described below. As will be described, this software is responsible for receiving, encapsulating and forwarding IP packets.
  edge region 300—typically, a CDN edge region configured for the overlay mechanism.
  intermediate server 306—typically, a server that receives encapsulated packets from an edge region 300 or other intermediate servers and forwards them on to other intermediate servers or to a gateway region.
  intermediate region 304—a region of intermediate servers.
  gateway server 310—typically, an edge server that has been configured to receive encapsulated packets from the overlay, and that applies source network address translation (NAT) to the original packets and forwards them onto the target server.
  gateway region 308—typically, a type of edge region comprising gateway servers and that is usually deployed on customer premises.
  Target server 312—a machine whose traffic is to be tunneled through the overlay.
  target address—the IP address of the target server; this address is sometimes referred to as a direct address when being compared to a CDN virtual IP address.
  slot—a single "instance" of the overlay; preferably, a slot is a numbered index that corresponds to a single target address.

virtual IP address—typically, a CDN address that corresponds to a slot; preferably, there is one virtual IP address per edge region per slot. It is sometimes referred to as a VIP.

path 314—an ordered set of CDN regions between an edge region and a gateway region.

path Segment 316—a single hop of a path.

tunnel 318—a set of one or more paths from an edge server to a gateway server.

session 320—A single end-to-end connection from the client 322 to the target server; preferably, the session is defined by a five tuple (IP payload protocol, source address, destination address, source port, destination port). The source is the client and the destination is the target.

Figure 4:
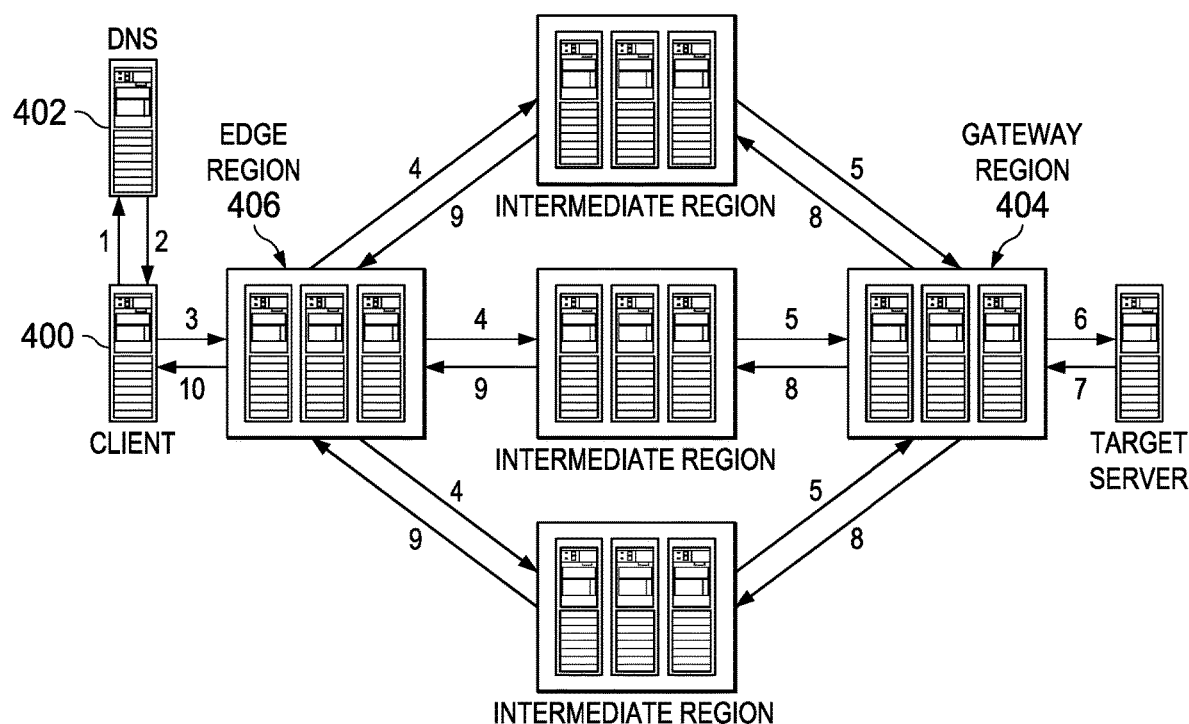
FIG. 4 illustrates a multi-path overlay IP (01P) routing mechanism implemented within a content delivery network, such as shown in FIG. 1.

In one known use scenario of the overlay network, one or more clients desire to send packets to a single IP address. This is illustrated in FIG. 4 and is now described. At step 1, the client 400 makes a DNS request to resolve a hostname, typically a hostname associated with a web-accessible application. This hostname is aliased (e.g., by a CNAME) to a domain that is being managed by an authoritative DNS 402; typically, the authoritative DNS is managed by the CDN service provider. Preferably, this hostname corresponds to a single gateway region (and target address) 404. This is also referred to as a slot, as described above. At step 2, the DNS query returns a single IP address for the hostname. This address identifies a best performing available edge region 406 and, preferably, that region is dedicated to the hostname. The address is referred to as a virtual IP address, as described above. At step 3, the client 400 begins to send IP packets to the virtual IP address. These packets are received by a server in the edge region 406. The edge region 406 knows the gateway region 404 to which to send the packets based on the destination address in the IP packet header. The packet is then encapsulated. At step 4, and based on routes preferably provided by a CDN mapping system, the edge server in the edge region 406 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 404, once again, preferably based on routes provided from the CDN mapping system. At step 6, the packets are received by a server in the gateway region 404, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 406 from which the client packet originated. At step 7, the gateway region 404 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the edge region.

The various connections used in the overlay network and as described typically are secured via SSL or other transport layer security (TLS) techniques.

Virtual Private Network (VPN)-as-a-Service

Generally, this disclosure provides various mechanisms to facilitate a virtual private network (VPN)-as-a-service (or more generally, "network-as-a-service") within the context of an overlay IP (OIP) routing mechanism such as shown in FIG. 3 and that comprises a portion of an overlay (or "content delivery") network ("CDN") such as shown in FIG. 1. This implementation, however, is not intended to be limiting, as the solution may be supported in any wireless or wire-line network, whether public or private, virtual or otherwise. The notion of networking "as a service" enables enterprises to effectively utilize Internet links as an optimized wide area network (WAN), connecting branches, data centers, teleworkers and mobile users to applications over the Internet. Driven by the impact of cloud computing and mobility, enterprises need a network service that can deliver an optimal and predictable cloud experience to users, preferably a network that is low-cost, easy-on, and global with security and optimization built-in.

Figure 5:
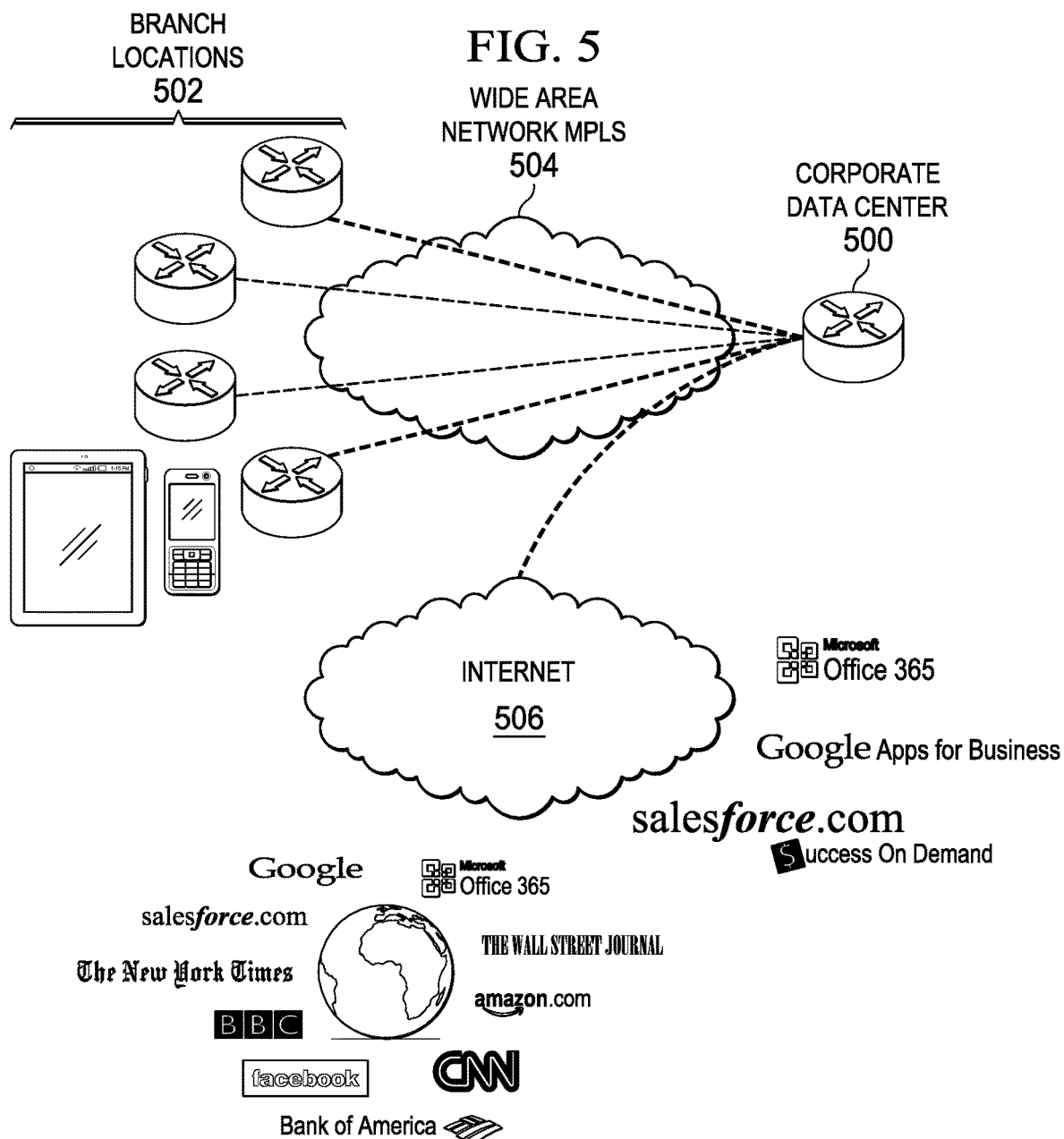
FIG. 5 illustrates a typical use case scenario for an enterprise that has a corporate data center to which are connected one or more branch locations, typically over wide area network Multi-Protocol Label Switching (MPLS)

FIG. 5 illustrates a typical use case scenario for an enterprise. The enterprise has a corporate data center 500 to which are connected one or more branch locations 502, typically over wide area network Multi-Protocol Label Switching (MPLS) 504. As noted above, MPLS is a standard-based technology for speeding up network traffic flow. In MPLS, a specific path (identified by a label) is set up for a given packet sequence, thereby obviating router look-up of a next address to which to forward the packet. As seen in FIG. 5, the enterprise may also wish to take advantage of third party software-as-a-service (SaaS) solutions 506, such as Microsoft Office 365, Google Apps, salesforce.com, and many others.

Figure 6:
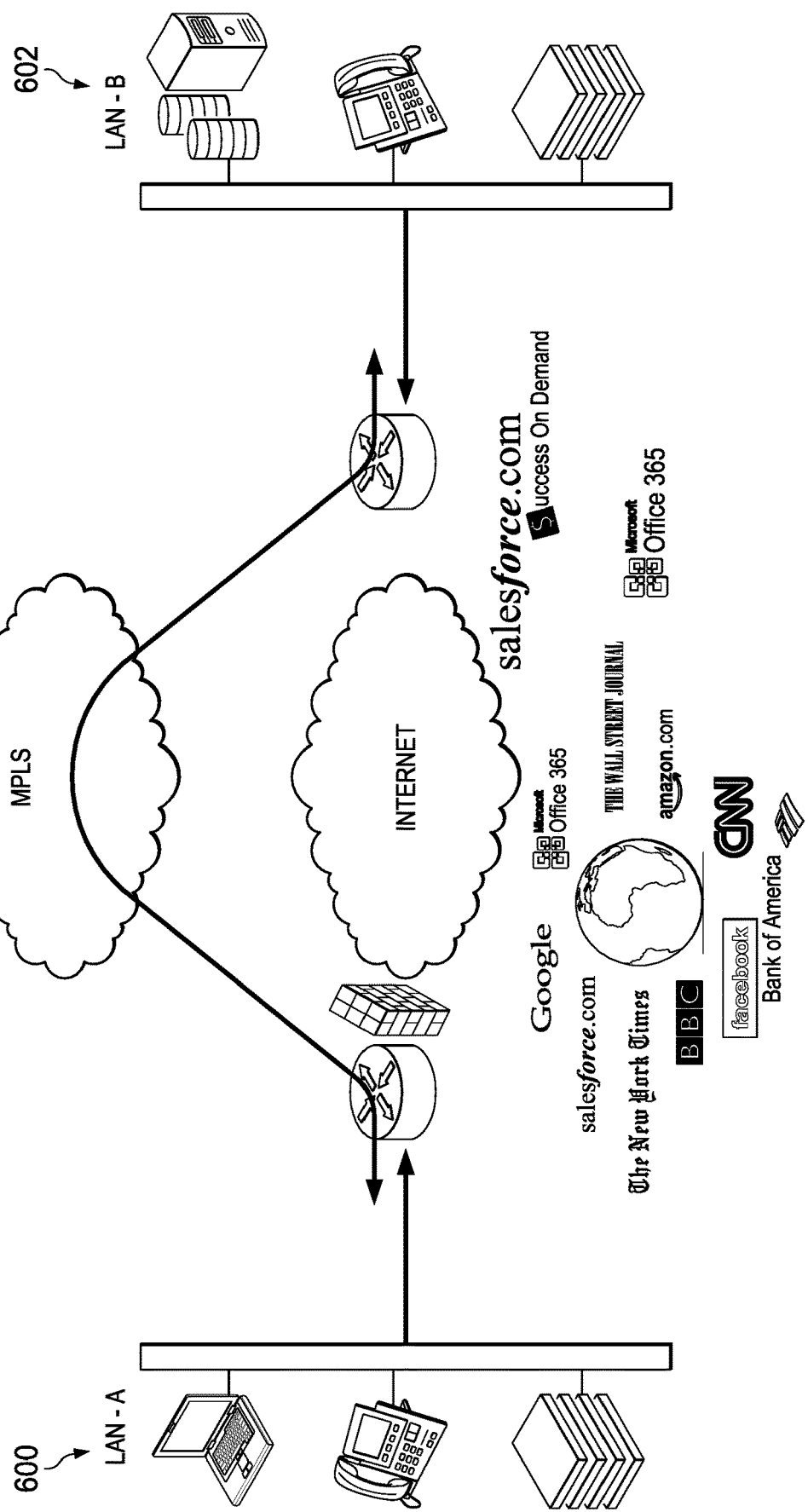
FIG. 6 illustrates an end-to-end path that uses MPLS.

FIG. 6 illustrates an end-to-end path that uses MPLS. In this example scenario, the enterprise branch office 600 is associated with LAN-A, and the corporate data center 602 is associated with LAN-B.

Figure 7:
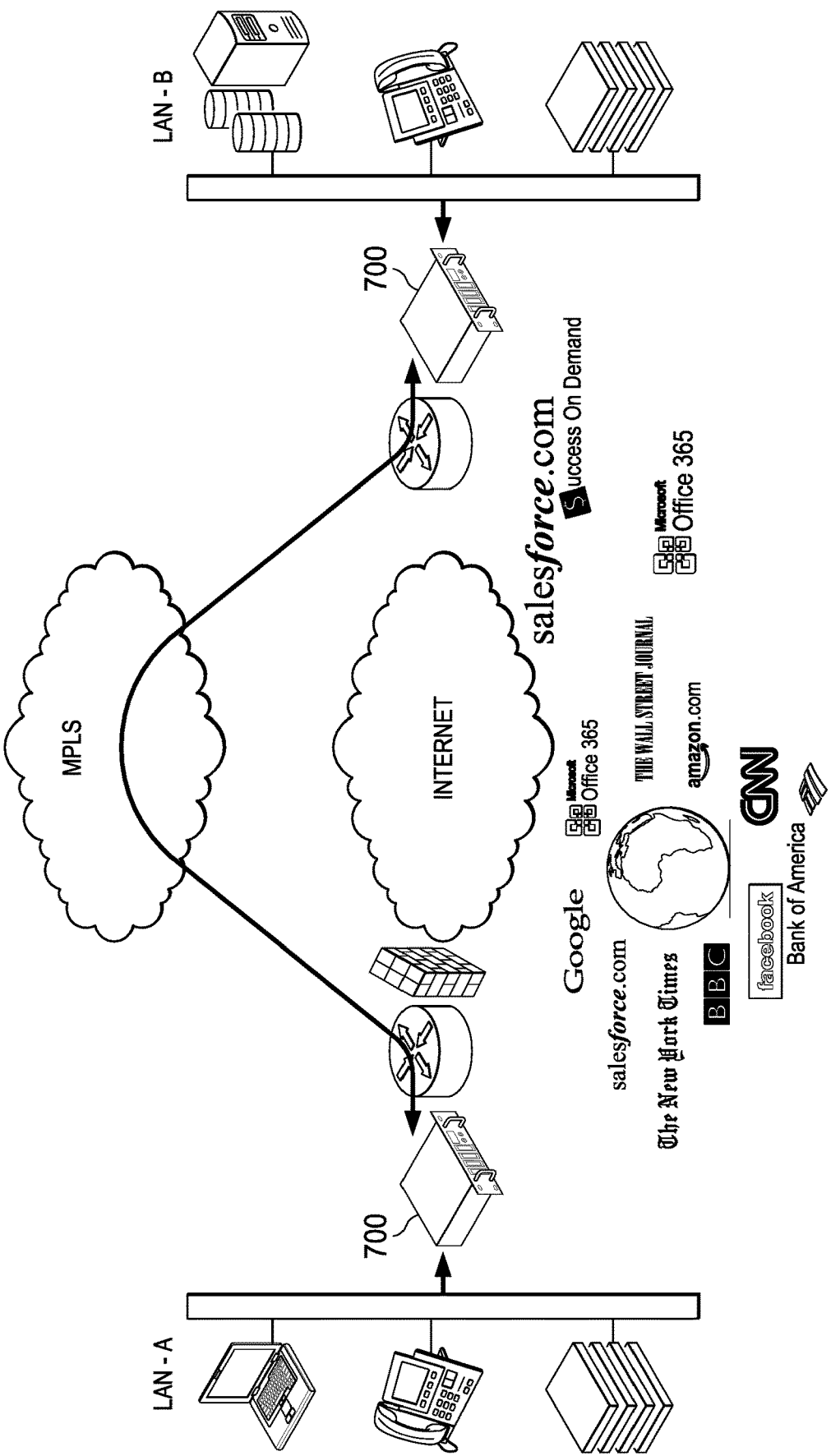
FIG. 7 corresponds to FIG. 5, but also includes the inclusion of overlay network appliances at each endpoint.

FIG. 7 corresponds to FIG. 5 but includes the inclusion of overlay network appliances 700 at each endpoint. An appliance 700 may be a rack-mounted hardware appliance having one or more processors, data storage, memory, networking support, and software (operating system, utilities, software applications, etc.). An edge machine, such as shown in FIG. 2, may be implemented as such an appliance. In addition, the software executing in an appliance can provide various types of end-to-end processing (e.g., encryption, deduplication, and the like) to facilitate the traffic flow across the wide area network. In addition, and depending on configuration, this software may also provide additional functionality to enable the enterprise to utilize the overlay including, for example, WAN service configuration, service management, service reporting, remote management access, customer SSL certificate management, as well as other functions for configured web applications. An appliance may be physical or virtual (e.g., supported as a virtual machine within a virtualized environment).

Figure 8:
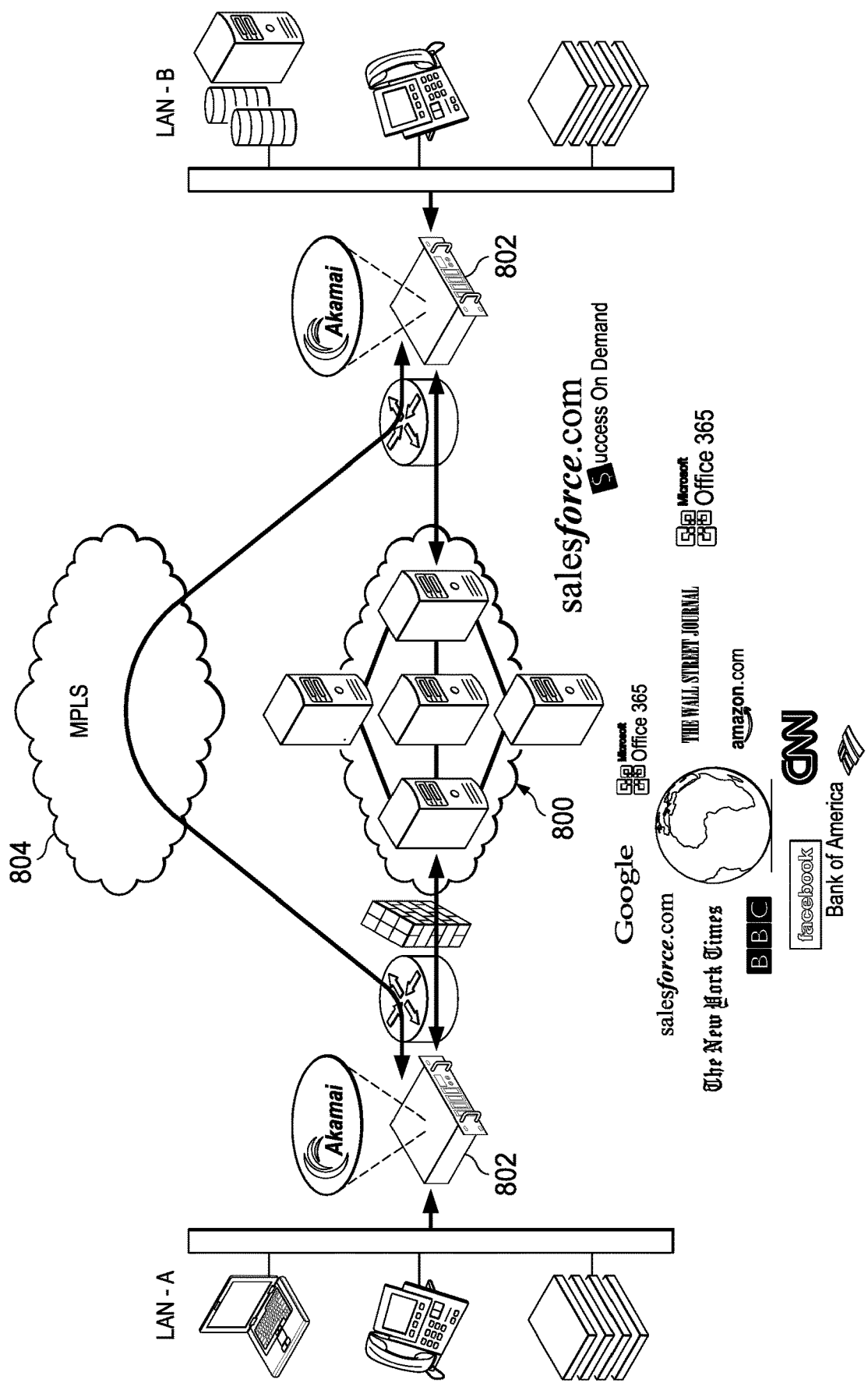
FIG. 8 corresponds to FIG. 7 but illustrates how the overlay network of FIGS. 1-4 can be used in conjunction with the overlay network appliances at each endpoint, wherein the overlay network provides an alternative to the MPLS routing approach.

FIG. 8 corresponds to FIG. 7 but illustrates how the overlay network 800 of FIGS. 3-4 can be used in conjunction with the overlay network appliances 802 at each endpoint. In this manner, the overlay network provides an alternative to the MPLS routing approach (path 804) of the prior art.

Figure 9:
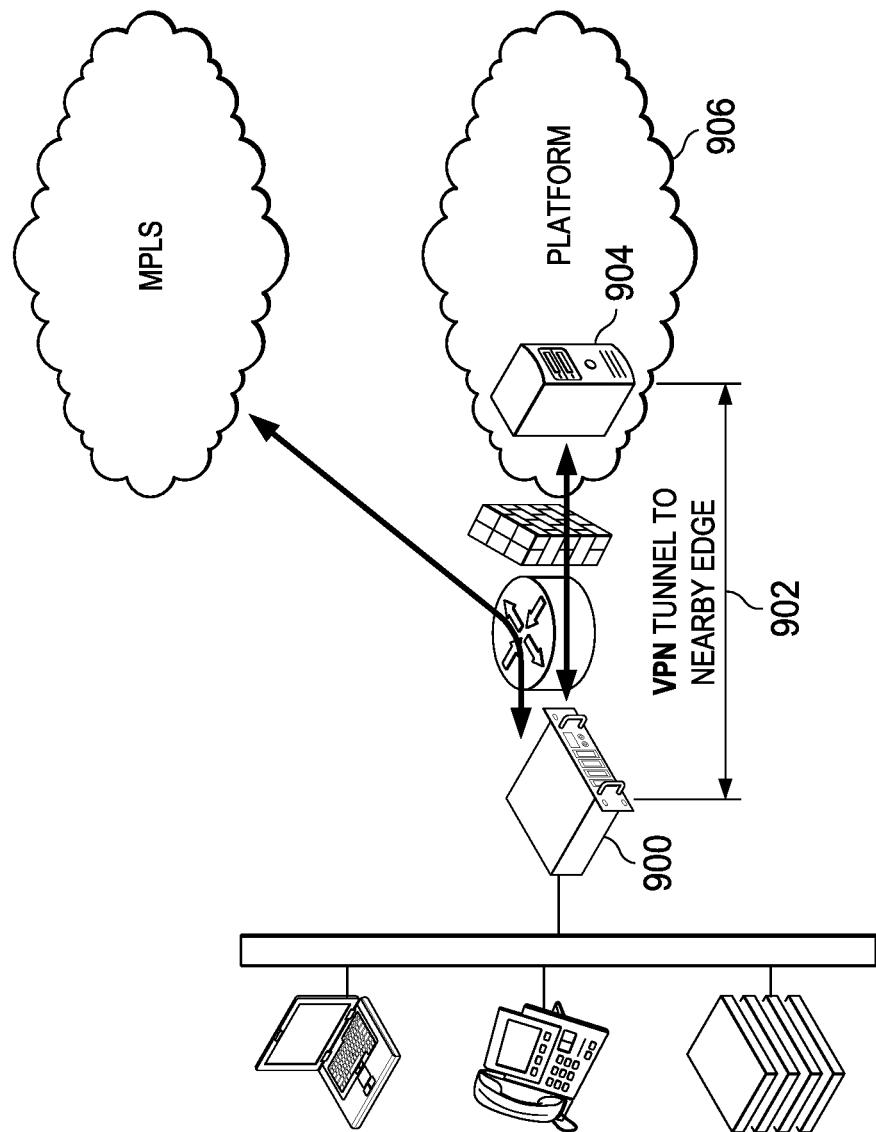
FIG. 9 illustrates how the overlay network appliance at one endpoint establishes a secure logical VPN tunnel to a nearby edge region or regions of the overlay network.

FIG. 9 illustrates how the overlay network appliance 900 at one endpoint establishes a secure logical VPN tunnel 902 to a nearby edge region or regions 904 of the overlay network 906. In this context, the network appliance 900 typically provides IPSec-based authentication and flow-based encryption, and the secure logical VPN tunnel 902 may incorporate one or more encrypted flows. Preferably, the edge 904 uses communications (e.g. keep-alive signaling) to maintain the tunnel through the enterprise firewall 908.

Figure 10:
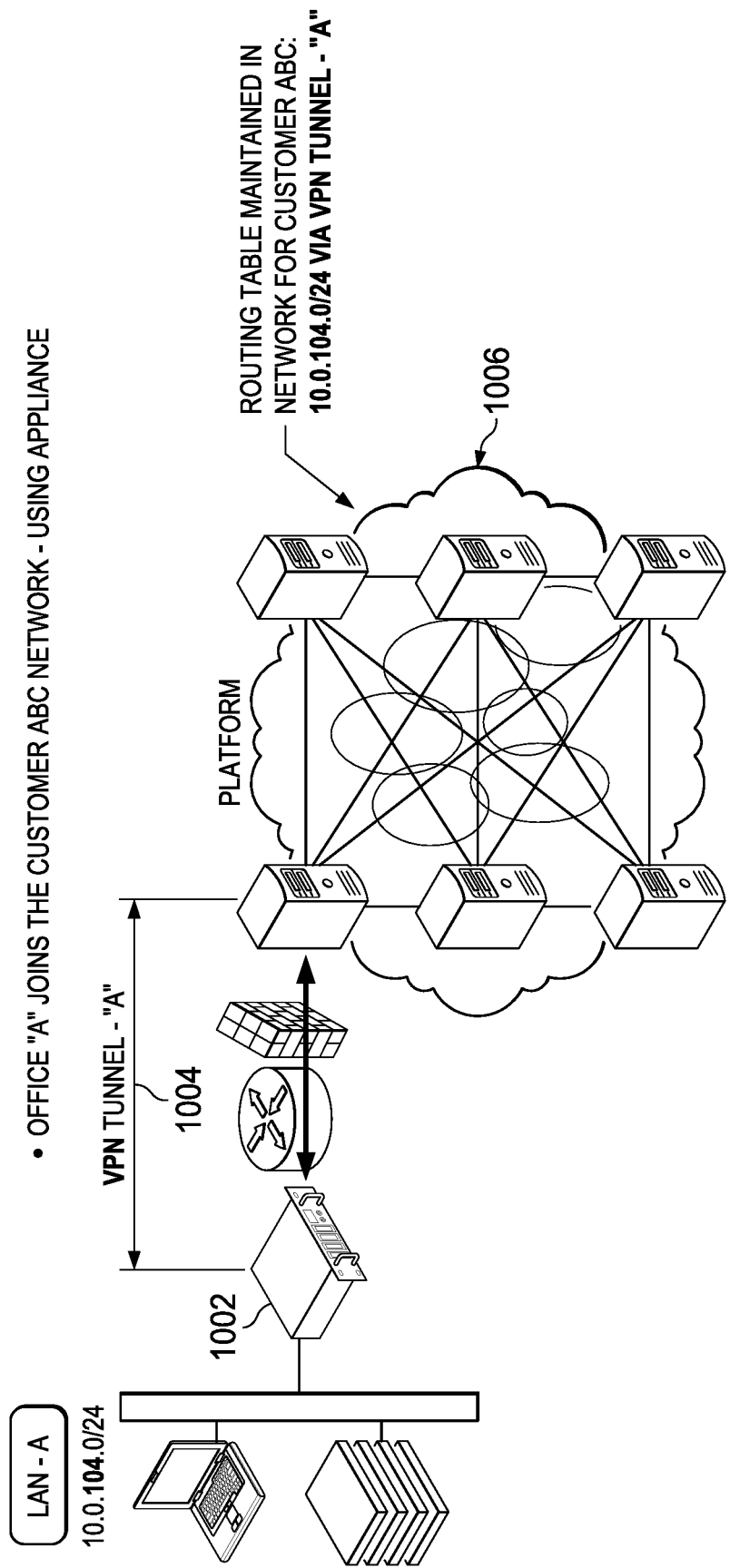
FIG. 10 illustrates a first Office A associated with an overlay network customer joining a customer network (ABC) after installing the network appliance and establishing the VPN tunnel to the overlay network (indicated as the platform) on a first side (LAN-A)

FIG. 10 illustrates a first Office A 1000 associated with an overlay network customer joining a customer network (ABC) after installing the network appliance 1002 and establishing the VPN tunnel 1004 to the overlay network (indicated as the platform 1006) on a first side (LAN-A). This arrangement can be established, for example, using a cloud-based portal UI by which the customer's administrator manually edits/adds LAN subnets to be associated with the appliance once it has been installed.

Figure 11:
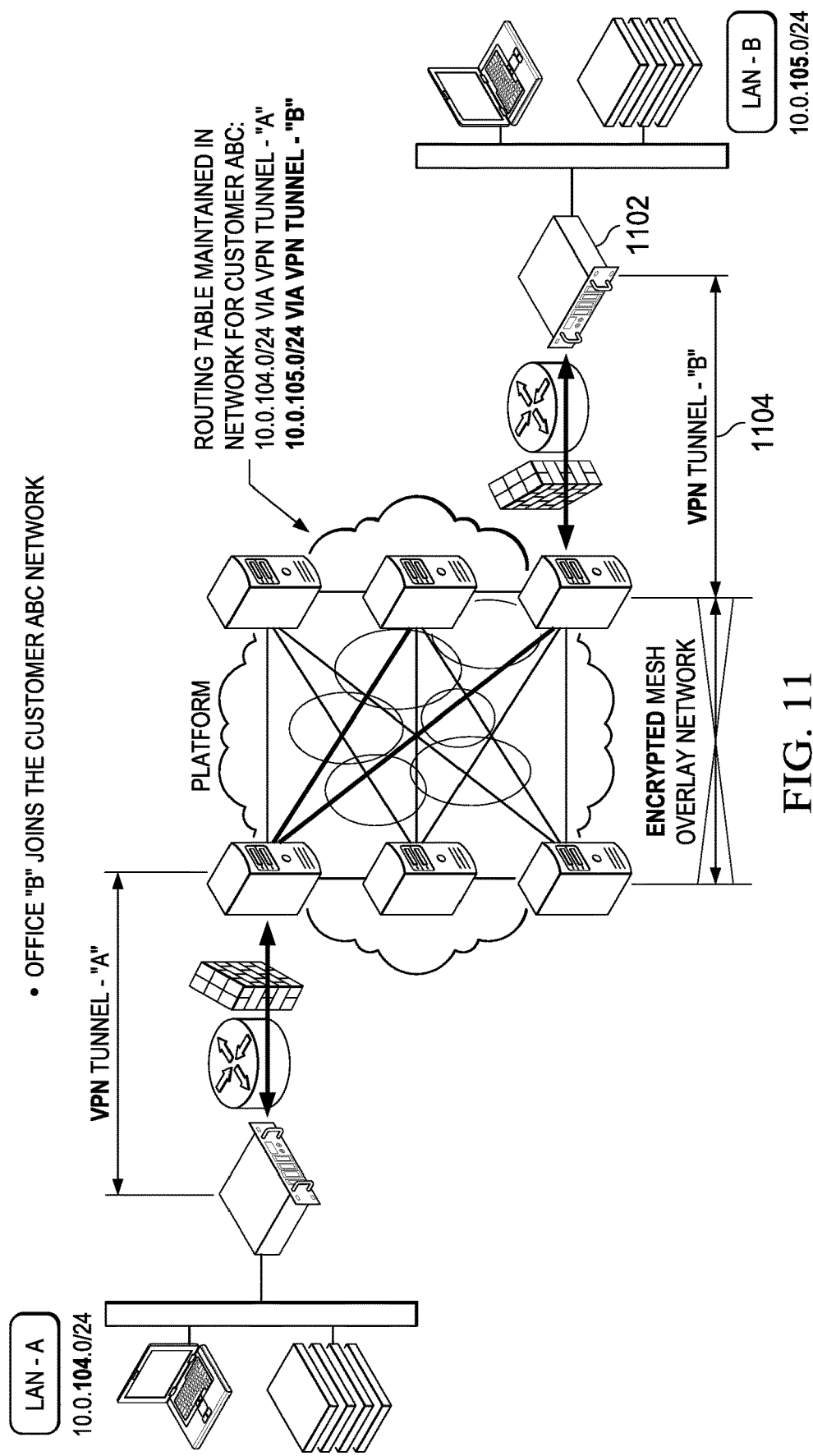
FIG. 11 illustrates a second Office B associated with the overlay network customer joining the customer network ABC after installing the network appliance on its side (LAN-B)

FIG. 11 illustrates a second Office B 1100 associated with the overlay network customer joining the customer network ABC (of FIG. 10) after installing the network appliance 1102 on its side (LAN-B) and establishing the VPN tunnel 1104.

Figure 12:
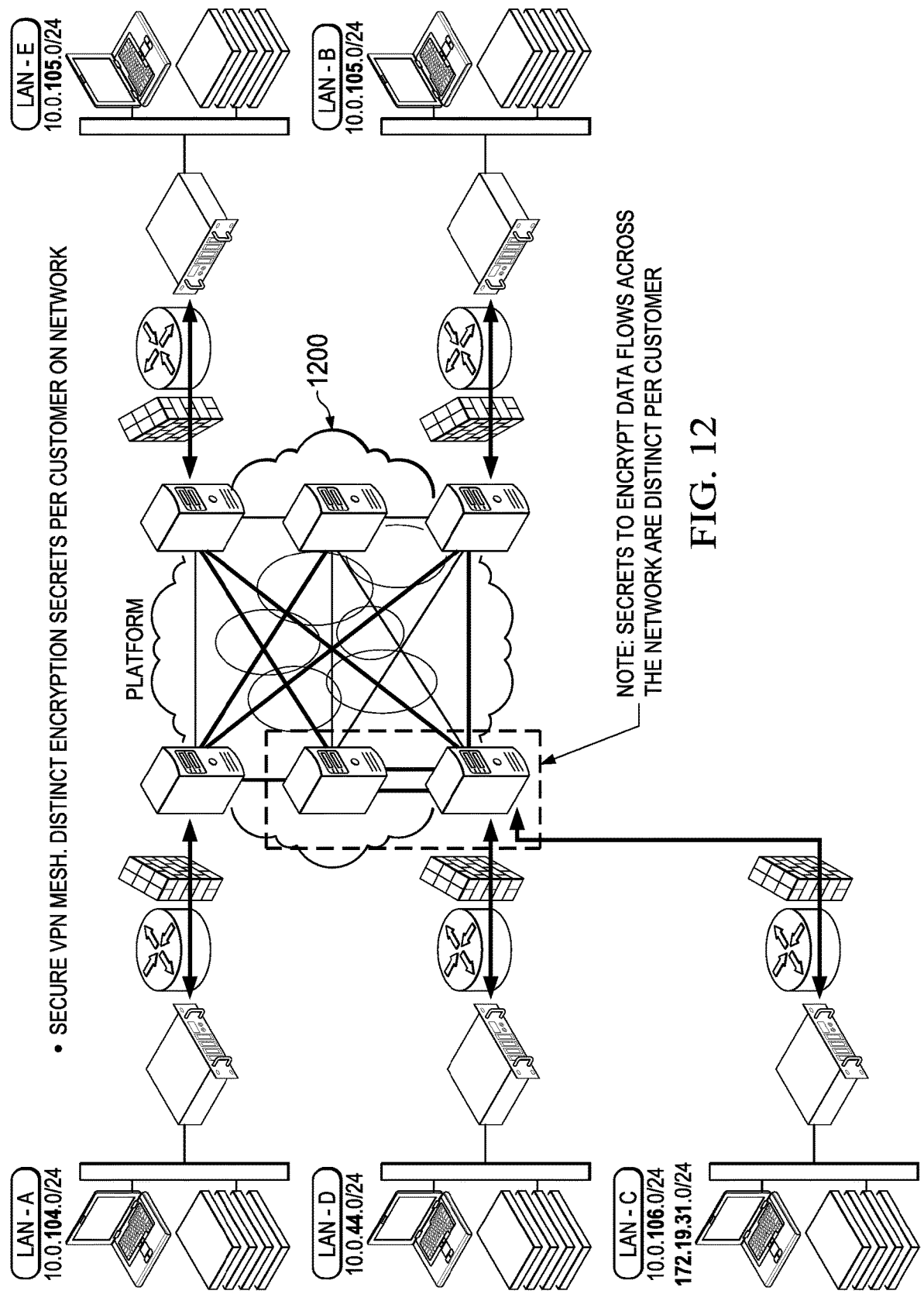
FIG. 12 illustrates how multiple overlay network customers can use the overlay network platform with the network appliances at their various locations after establishing the secure VPN tunnel to their nearby edge region(s)

FIG. 12 illustrates how multiple overlay network customers can use the overlay network platform 1200 with the network appliances 1202 at their various locations after establishing the secure VPN tunnel, such as tunnel 1204, to their nearby edge region(s) 1206. In this embodiment, distinct encryption secrets per customer are maintained.

Figure 13:
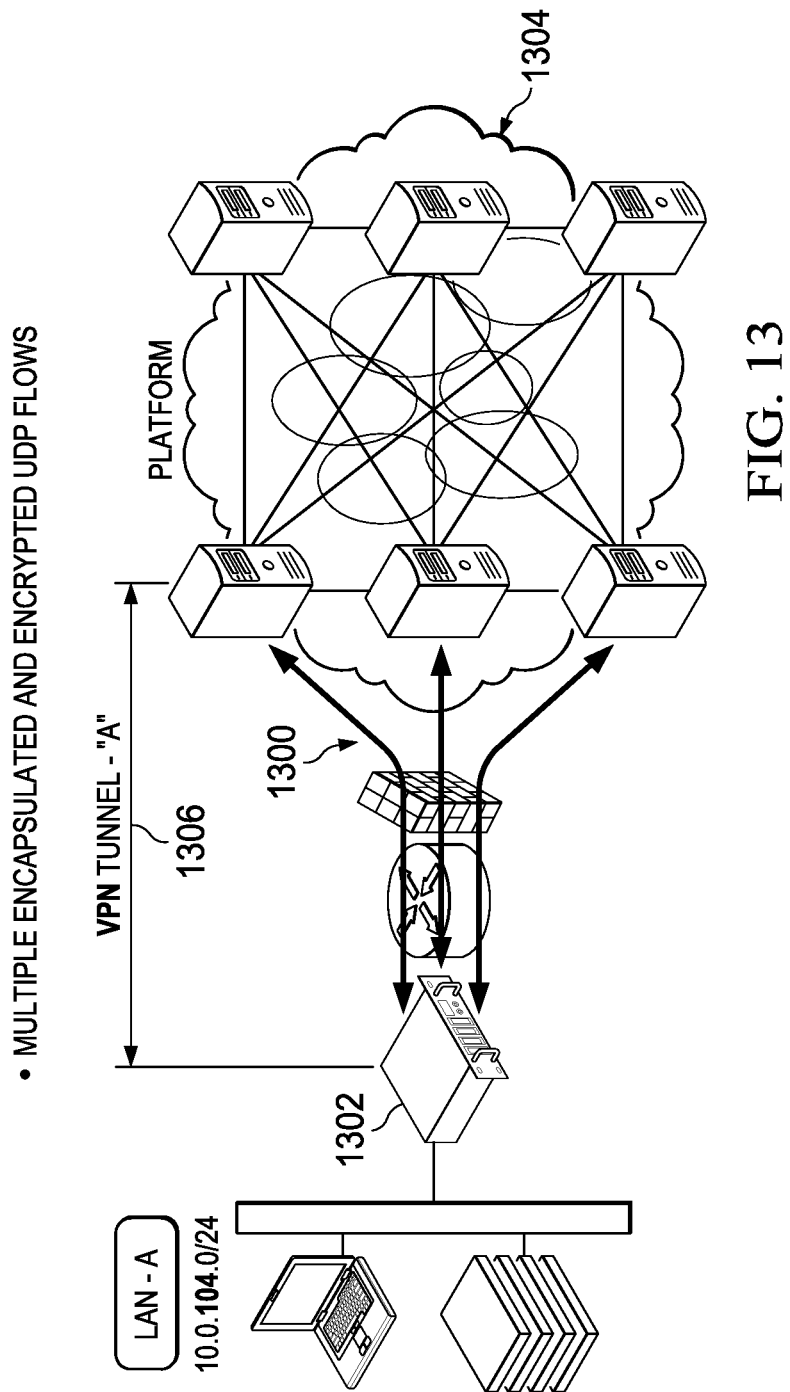
FIG. 13 illustrates how multiple encapsulated and encrypted flows may be provided between a network appliance and the overlay network platform following the establishment of the secure VPN tunnel to the overlay network region or regions.

FIG. 13 illustrates how multiple encapsulated and encrypted flows 1300 (here, UDP-based) may be provided between a network appliance 1302 and the overlay network platform 1304 following the establishment of the secure VPN tunnel 1306 to the overlay network region or regions.

Figure 14:
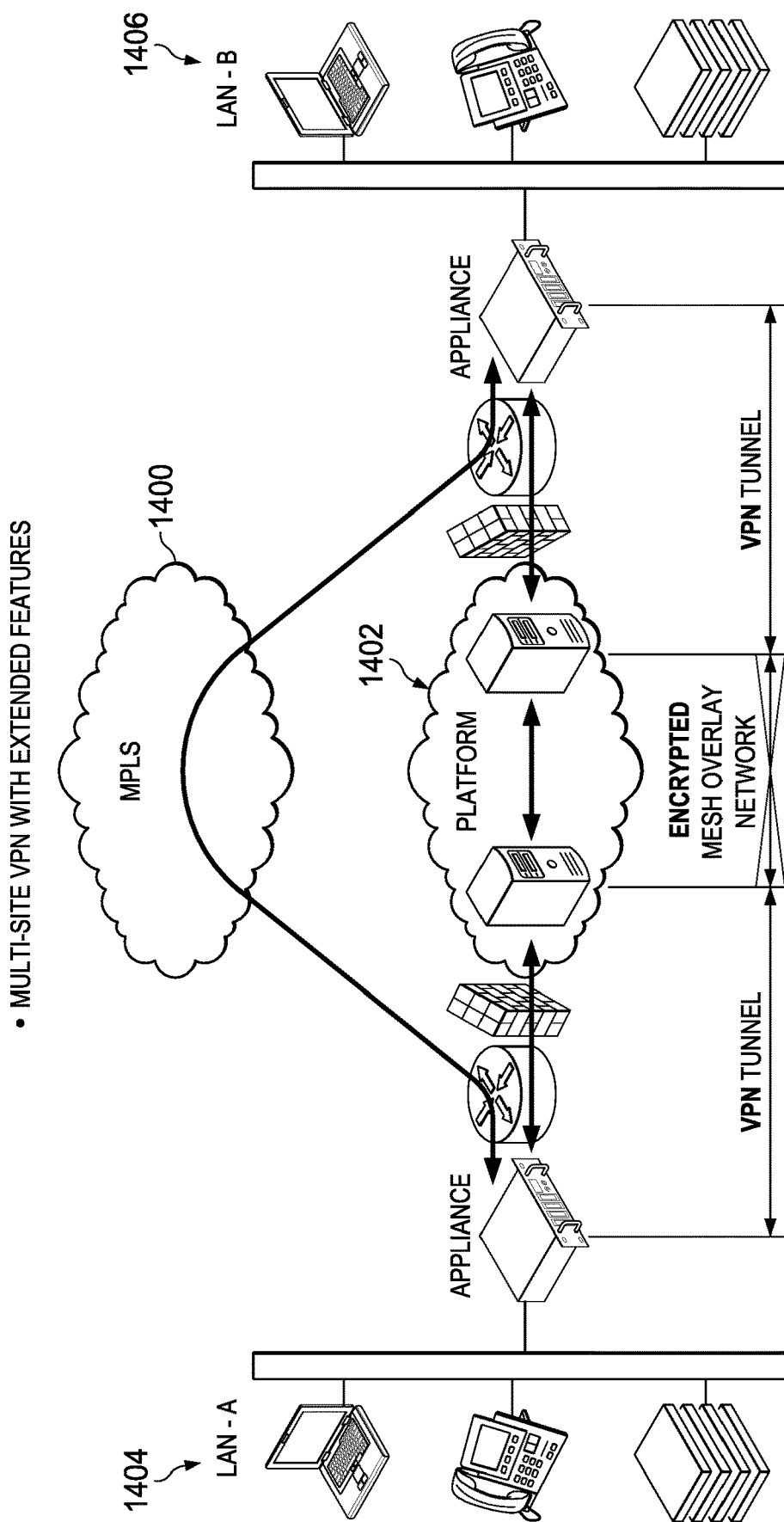
FIG. 14 illustrates an end-to-end multi-site VPN wherein both MPLS and overlay network routing may be implemented between the endpoints.

FIG. 14 illustrates the end-to-end multi-site VPN wherein both MPLS 1400 and overlay network routing over the overlay network 1402 may be implemented between the endpoints, namely (for example) LAN-A 1404, and LAN-B 1406. Here, the overlay network provides an encrypted mesh overlay network with independent authentication from appliance to edge, customer-specific and isolated private IP routing, multi-path delivery with data packet replication (using the approach shown in FIG. 3), and, as will be described in the context of FIG. 16, TCP termination of private TCP/IP flows. As illustrated in FIG. 14, overlay network customers may maintain their dedicated MPLS capacity links 1400, but they can also utilize the overlay network 1402 to provide a lower cost alternative path. In one embodiment, and after installing the network appliances, a customer uses both the MPLS and overlay network links. In another embodiment, and upon a given condition or occurrence, some of the traffic is migrated from the MPLS link to the overlay. A percentage of the customer's traffic may be split off and delivered using the overlay. One type of customer traffic may use the MPLS link, while another type of customer traffic may use the overlay network. The overlay, as shown in FIG. 12, preferably is multi-tenant in that multiple customers use the encrypted mesh overlay network at the same time once the network appliances are positioned and configured.

The approach illustrated in FIG. 14 provides overlay network customers with an alternative to MPLS and other similar dedicated capacity solutions. The overlay network optimizes internet transport and routing between the network appliances for all traffic types, while still allowing these appliances to provide data stream and application layer optimizations (e.g., encryption, deduplication, and the like).

Figure 15:
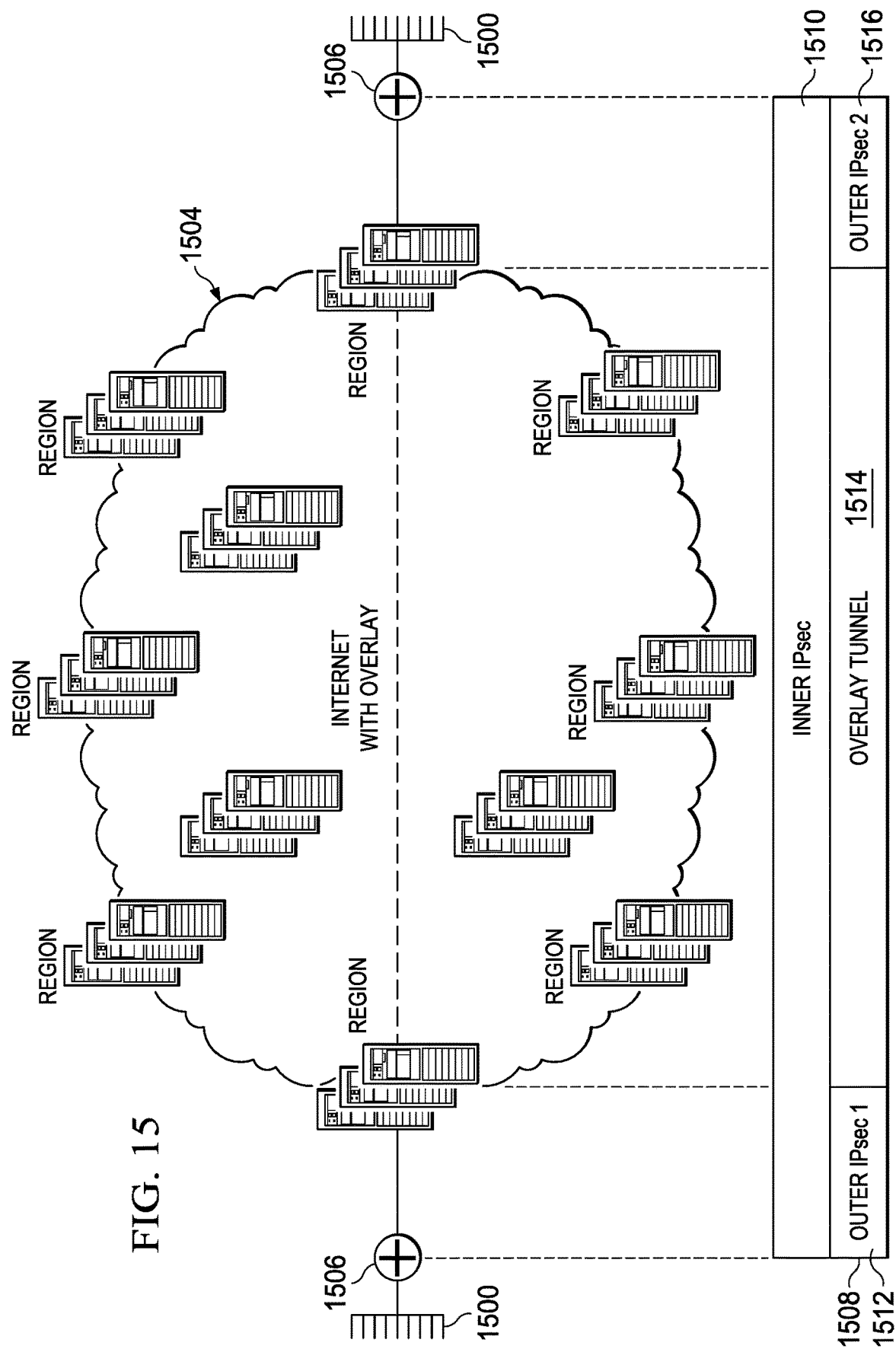
FIG. 15 illustrates an overlay tunneling approach wherein an outer tunnel is split and segmented, and an inner tunnel is secure end-to-end.

FIG. 15 illustrates how the overlay network appliances can be controlled to configure the end-to-end VPN tunnel to exhibit distinct security contexts. As previously described, it is assumed that the overlay network customer desires to connect LAN 1500 and LAN 1502 via the Internet-based overlay 1504. To that end, appliances 1506 are positioned at or adjacent to each endpoint. In this embodiment, the appliances are then operative to create and maintain a split outer security context 1508, and an inner security context 1510 that is secure end-to-end. Preferably, the inner security context 1510 is used for customer data. The split outer security context 1508 comprises first segment 1512 that is an outer IPsec segment, an intermediary security context section 1514, and second outer segment 1516, which is also an outer IPsec segment. Thus, and as can be seen, the overlay tunnel is split and segmented, and the inner tunnel is secure end-to-end. The outer tunnel encapsulates the inner tunnel.

In the "nested" approach depicted in FIG. 15, the single, segmented VPN tunnel delivers packets end-to-end, but using distinct security contexts. In this approach, each outer side-to-overlay network segment provides an ability to implement authentication at the segment boundary. Because authentication can be implemented on a per-segment basis, the overlay network provider can ensure that a third party cannot use the overlay network inappropriately while at the same time causing such use to be billed to a legitimate overlay network customer. The approach also prevents unauthorized access to the overlay network either for gaining access to a customer's internal network, or to gain optimized Internet transport and routing.

In one implementation, packets transmitted between the network appliances (at each end) and the overlay network use IPsec Encapsulating Security Protocol (ESP) for authentication to restrict access to the overlay network. These packets preferably use customized ESP framing to protect customer networking details, e.g., by encrypting just the network and transport layer protocol headers. In this example embodiment, IPsec Security Associations (SAs) are negotiated using certificate-based mutual authentication. The session layer endpoints for authentication and header encryption on packets exchanged between network appliances and the overlay network are the appliance and the overlay network region. Customer networking details are re-encrypted (using a shared symmetric per-customer key) on the overlay ingress region to protect them while in-transit to the overlay egress region. The overlay network provider may provide appropriate key management infrastructure for managing and protecting such customer keys. The session layer endpoints for encryption of network details on packets exchanged between overlay network regions are the overlay ingress and egress regions. Data encryption/decryption by overlay middle regions is not required.

VPN-as-a-Service with Transport Protocol Layer Optimizations and End-to-End Data Security With the above as background, a preferred technique of this disclosure is now described.

One of the primary requirements for convincing customers to shift their traffic onto an overlay network such as described above is to provide a relatively equivalent degree of privacy over the public Internet to what they expect from their existing dedicated capacity links (such as MPLS). The techniques of this disclosure provide this guarantee. In particular, and as illustrated and described (e.g., see FIG. 15), the traffic that flows over the Internet via the overlay network preferably uses authentication, encryption, and network management to provide a virtual private network (VPN) connecting the customer's network appliances. The customer's data remains completely secure, but the traffic flows can take advantage of the benefits provided by the overlay network itself.

Figure 16:
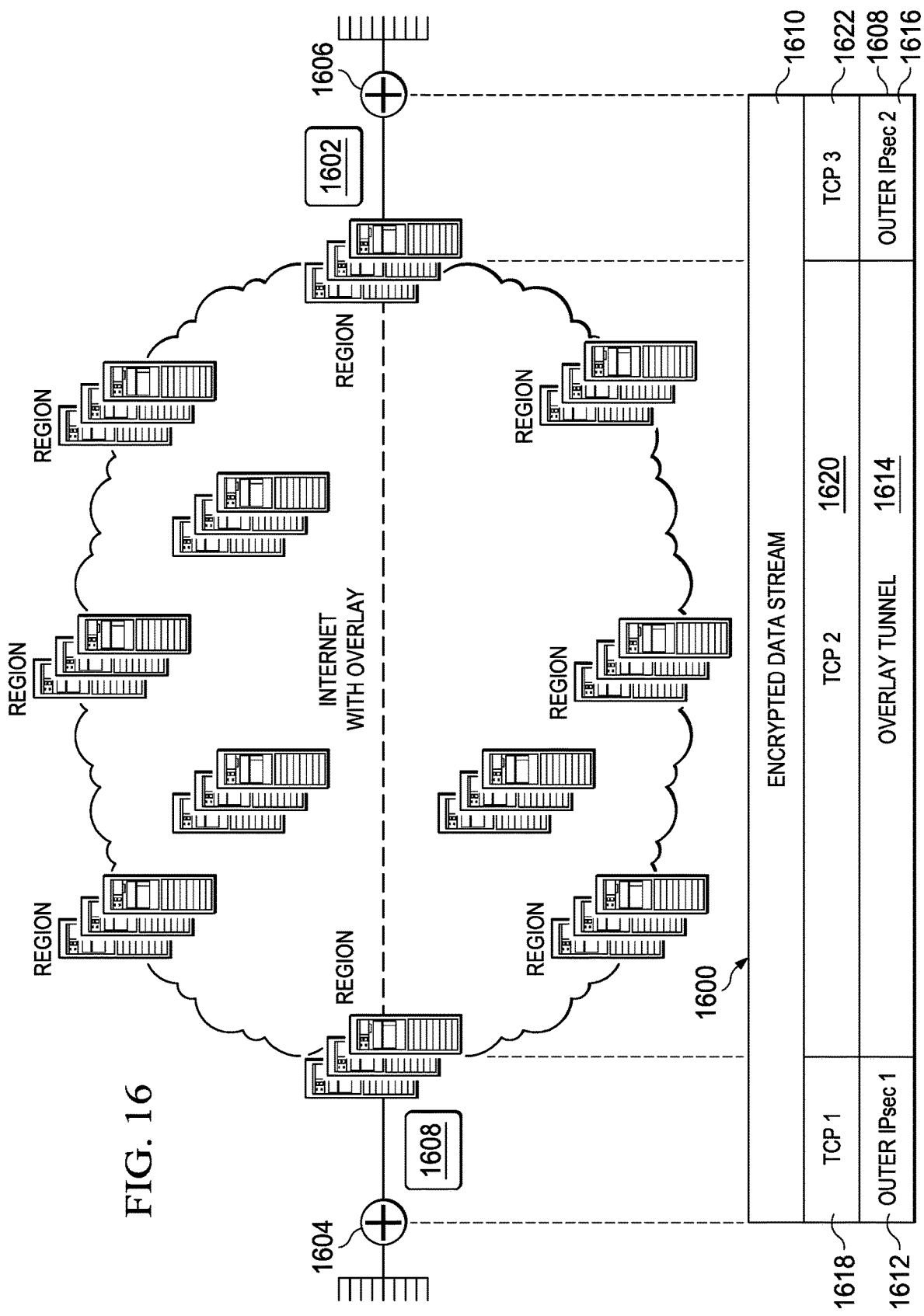
FIG. 16 illustrates the technique of the subject disclosure wherein the overlay network establishes and maintains distinct encryption contexts for packet data, on the one hand, and TCP/IP headers, on the other hand; this split encryption context approach facilitates the application (by the overlay network) of one or more TCP optimizations to TCP flows while at the same time ensuring that data flows are never available in the clear as the traffic is routed and delivered across the overlay network.

In particular, a key benefit (available from the overlay network) is the providing of one or more TCP optimizations, such as packet loss mitigation, TCP buffer management, and others. To enable an overlay network customer to leverage the full scope of TCP optimizations available from the overlay network provider, the technique shown in FIG. 15 is extended as now described. In particular, FIG. 16 illustrates the technique of the subject disclosure wherein the overlay network establishes and maintains between a pair of appliances a single, segmented tunnel delivering packets (across the routing overlay) end-to-end, but wherein split security contexts are enforced for particular portions of each data packet. In this disclosure, a "security context" typically refers to an "encryption context" that is enabled by or associated with one or more cryptographic keys and associated cryptographic algorithms. The particular nature of an encryption context is not a limitation of this disclosure; rather, the notion here is that there are two (2) distinct and different encryption contexts enforced across the single, segmented tunnel 1600. The first encryption context is defined by a first cryptographic key (or "first key") 1602 that is shared between the network appliances 1604 and 1606 across which the end-to-end tunnel 1600 is established. The second encryption context is defined by a second cryptographic key (or "second key") 1608 that is shared between an appliance (such as appliance 1604) and some edge machine, such as edge server 1611, with which the appliance is associated. The first key is distinct from the second key, and the keys are not shared across the encryption contexts. Because the first key and the second key are used in this distinct manner, it can be seen that the first encryption context differs from and is distinct from the second encryption context. The second encryption context is split and segmented, as described above.

Because the keys are not shared and are not the same, the appliance-to-appliance encryption context differs from an appliance-to-edge encryption context. In this manner, TCP connections across the overlay can be split and segmented to create distinct TCP segments 1618, (TCP 1), 1620 (TCP 2), and 1622 (TCP 3), while the encrypted data stream 1610 is never terminated. As a consequence, however, the TCP/IP header flows (which occur over the distinct TCP segments) can be and, preferably, are terminated according to this preferred embodiment to enable the overlay network to apply one or more TCP optimizations to the TCP flows.

To this end, and according to this disclosure, the split encryption context approach is applied with respect to the data flows, on the one hand, and to the network and transport protocol layer (e.g., TCP/IP) headers, on the other hand. Thus, first and second appliances are configured to establish and maintain the above-described first and second encryption contexts, wherein the first encryption context extends end-to-end between the appliances, and wherein the second encryption context comprises a set of transport protocol segments including a first outer transport protocol segment 1616 between the first appliance 1604 and the ingress point (e.g., server 1611), a second outer transport protocol segment 1620 between the egress point and the second appliance 1606, and an intermediary transport protocol segment 1618 between the first and second outer segments. There may be multiple intermediary transport protocol segments. The first encryption context protects data flow end-to-end between the first appliance and the second appliance, and the second encryption context protects transport and network protocol layer headers. In particular, during delivery of a packet, a data portion of the packet has the first encryption context, and a TCP/IP portion of the packet has the second encryption context. Accordingly, the cryptographic keys that comprise the second encryption keys can be used to enable decryption of the TCP/IP flows at the various segment boundaries. Because the TCP/IP flows (but not the associated customer data flows) are terminated, the overlay network can apply its various delivery optimizations. These delivery optimizations potentially include both TCP optimizations for the TCP flows, as well as routing optimizations across the overlay. Thus, as traffic is delivered across the overlay, those delivery optimizations may be applied (on a segment-by-segment basis) while still ensuring that the data portions of the flow are never available in the clear.

As can be seen then, this approach extends the approach in FIG. 15 and enables both transport protocol (e.g., TCP) and routing optimizations to be applied.

The particular manner in which the encryption is applied within a particular encryption context may vary. These known techniques include pre-established symmetric keys, certificate-based mutual authentication, and many others. A preferred technique is for each network appliance to provide data encryption for appliance-to-appliance TCP connections, preferably using TLS with cert-based mutual authentication. As noted, applying encryption at this level via the split encryption context allows application of the overlay network's existing TCP-layer optimization techniques without the need for data decryption on the edge. Preferably, traffic flowing between the network appliance and the overlay network edge uses certificate-based mutual authentication with X.509 certs. In addition, preferably per-customer appliance whitelists are also distributed to the overlay network for use in appliance authentication. In one example embodiment, authentication and symmetric key generation/exchange are performed using IKEv2 (RFC 5996), with packets exchanged between the appliance and the overlay network using IPsec Encapsulating Security Payload (RFC 4303) in tunnel mode. As noted above, these ESP packets provide data integrity for the entire packet, but because the data is known to be encrypted, it need not be re-encrypted for transmission to the overlay network.

Preferably, the IP and transport protocol headers in the tunneled packets are encrypted before transmission over the public Internet. Encrypting only the network and transport layer headers improves performance characteristics of packet handling.

As illustrated in FIG. 16, in addition to the TCP connections used for data stream optimization, preferably the network appliance also supports optimized routing for datagram-oriented flows (e.g. UDP, ICMP, non-terminated TCP, etc.). Most flows in this category would be negatively impacted if they were sent through a TCP-based SSL stream, so preferably a datagram-based encryption method is used. Two example options that may be used for this purpose include Datagram TLS (DTLS), and combined Internet Key Exchange (IKE) and IP Security (IPSec). DTLS provides mutual authentication, data integrity, and data security capabilities. IKE and IPSec together play the same role as DTLS. IKE provides mutual authentication and secure symmetric key exchange. The keys exchanged via IKE can be used by IPsec to provide per-packet authentication, data integrity, and data security.

IP Sec Load Balancing

The following assumes the reader's familiarity with IPsec VPN.

In particular, and as is well-known, a VPN extends a private network across a public network, such as the Internet. The IPsec protocol supports network-level peer authentication, data origin authentication, data integrity, data confidentiality (encryption), and replay protection. IPsec uses various protocols to perform various functions including, among others, Encapsulating Security Payloads (ESP), which provides confidentiality, data-origin authentication, and an anti-replay service (a form of partial sequence integrity), and Security Associations (SA), which provides a set algorithms and data that provide the parameters necessary to the ESP operations. A Security Association is the establishment of shared security attributes between two network entities to support secure communication. An SA may include attributes such as: cryptographic algorithm and mode; traffic encryption key; and parameters for the network data to be passed over the connection. A component of an SA is a Security Parameter Index (SPI), an identification tag added to a header while using IPsec for tunneling the IP traffic. This tag differentiates two traffic streams where different encryption rules and algorithms may be in use.

It should be appreciated that the overlay routing network itself acts as a VPN cluster concentrator with respect to the IPsec flows that traverse that network. In addition, it should also be appreciated that an individual edge region (see, e.g., FIG. 3, and edge region 300) within that overlay also acts as a VPN cluster concentrator with respect to the IPsec flows. The following discussion regarding IPsec load balancing is provided in the context of a VPN cluster concentrator that is implemented within the overlay edge region, e.g., the overlay edge region located at an ingress point to the overlay. While this is one preferred implementation scenario, it is not intended to be limited, as the IPsec load balancing techniques described herein are applicable to any VPN cluster concentrator, regardless of how, or in what operational context, that concentrator is implemented.

In this example scenario, and has been described above, the network appliance (e.g., located in association with an overlay customer endpoint location) connects to overlay network edge region (that corresponds to the VPN cluster concentrator); the edge region in this example is located at the ingress point to the overlay. In FIG. 16 in particular, this is represented by the line between network appliance 1604 and the first edge region. An edge region, as explained in association with FIG. 3, includes multiple machines (e.g., edge servers). As also described above, there may be many client hosts (e.g., located in the customer LAN) connecting to the network appliance, and thus multiple flows are expected to originate from the customer endpoint and pass through the network appliance and into the VPN cluster concentrator (here, the first edge region) and, conversely, that are directed from the VPN cluster concentrator back to the customer endpoint (and, in particular, a particular host in the LAN), According to this portion of the disclosure, the network appliance is coupled to the VPN cluster concentrator (the edge region) over a tunnel that itself is managed as a single logical entity. In this example, the single logical tunnel has a "load" that comprises the plurality of data flows originating from the multiple hosts that are located within the customer endpoint location and that are received at the VPN cluster concentrator (here, the edge region), as well as the data flows originating from machines in the VPN cluster concentrator and that are destined for one or more of those hosts. In this context, it should be appreciated that the load of this single logical tunnel may be such as to exceed the ability of any one of the VPN cluster concentrator machines to handle that load. As such, and according to this disclosure, one of the VPN cluster concentrator machines executes a load balancer routine (e.g., software instructions executing in hardware) to balance those data flows across the machines in the VPN cluster concentrator. This in-VPN cluster concentrator load balancing may be carried out by any one of the machines in the VPN cluster concentrator. Typically, a single one of the machines is elected as a "leader" and performs the load balancing function for the set of machines in the VPN cluster concentrator (in this example, the overlay network edge region). A leader election algorithm may be implemented across the machines in the region to determine which machine will have this particular responsibility. The load balancing routine implements load balancing across the machines (or a subset thereof) according to one or more load balancing criteria.

Within the context of this disclosure, the particular type of load balancing (e.g., round robin, consistent hashing-based, or otherwise) is not a limitation, as any well-known load balancing algorithm (load allocation) can be implemented. Rather, the technique herein ensures that load balancing of the data flows within the single logical tunnel is achieved while ensuring that two important additional characteristics are met: (1) that load within the single logical tunnel is shared among the machines in the VPN cluster concentrator, with flows shifted across those machines as necessary for load balancing, while maintaining an assurance that replay protection remains in place (in other words, that packet replays can be detected); and (2) that a particular flow that has been directed to a particular machine in the VPN cluster concentrator is persisted to the machine so as to avoid problems associated with packet re-ordering that would otherwise be required if this specific data flow-per cluster machine association were not enforced during load balancing.

As used herein, a VPN cluster concentrator "machine" refers to any machine or machine-implemented resource(s) thereon that handles the processing of the data flows. A VPN cluster concentrator machine may be physical or virtual.

To achieve these benefits, there are several techniques that are implemented. First, the load balancing itself is enabled with respect to a "flow identifier hash" value that is generated by the network appliance. With respect to a particular data flow between an ultimate endpoint host (e.g., FIG. 11, in LAN-A) and another endpoint host (e.g., FIG. 11, in LAN-B), flow identifier preferably is a four tuple consisting of: source IP address, destination IP address, source transport protocol (e.g., TCP, UDP) port, and destination transport protocol port. In the alternative, the flow identifier may incorporate some but not all of these values. However the particular flow identifier is formed (for a particular data flow), it is then hashed (e.g., by an algorithm such as MD5, SHA-1, etc.) into a flow identifier hash value. Due to the hashing, the particular tuple values are masked (obfuscated), and thus the flow identifier hash cannot be used to uniquely identify the flow or the source or destination endpoints. While hashing is the preferred technique to create the value, other techniques (such as applying some other function to the source and destination data) may be used.

The flow identifier hash value, rather, is generated by the network appliance and passed to the VPN cluster concentrator-based load balancer routine to facilitate the load balancing. In particular, the flow identifier hash value can be used by the load balancer to determine where a particular data flow (within the single logical tunnel) should be directed within the VPN cluster concentrator. Preferably, this flow identifier hash value is passed in an ESP payload.

In addition, and to facilitate the replay protection technique of this disclosure, the load balancer itself maintains a special sequence number namespace. This namespace may be created out of a number of bits (e.g., the upper 7 bits) in an SPI, where the SPI is a unique identifier for the SA endpoint host that selected it. Using this namespace, individual machines in the cluster can maintain sequence numbers that are unique for each of certain host-specific SPI values. Using a namespace that has been partitioned in this manner, host-specific replay protection is enabled. When a data flow arrives at the VPN cluster concentrator but has not yet been associated (by the load balancer) with a particular machine in the region, the high order SPI bits associated with that flow may be set to a generic (global) value, such as all "1s" (representing the number 127). That flow will include the flow identifier hash value, which as noted is used by the load balancer to direct the flow to a particular machine. The machine that receives and handles the flow may then return to the appliance one of SPI values (from within its associated portion of the partitioned namespace) so that the appliance then has knowledge that the particular flow has been assigned to a particular machine. When additional packets for the flow (i.e. having the same flow identifier hash value) are then sent by the appliance back to the VPN cluster, those packets are associated with the SPI value that had been returned, thereby linking the flow (from then on) with the particular machine yet assuring that replay protection remains in place.

The following section provides additional implementation details regarding the above-described techniques.

In particular, and as noted, there may any number of client machines behind a single network appliance, which means that each appliance could be associated with a large number of distinct connections. In addition, a single overlay network region may be acting as the IPsec tunnel entry point for any number of distinct appliances. For these reasons, it is desirable to be able to balance the IPsec processing load across an overlay network region by distributing incoming packets across multiple machines in the region. To limit the load associated with in-region forwarding, it is desirable to avoid the need for the load balancer to authenticate and decrypt packets before they can be forwarded in-region. At the same time, as packets are distributed among multiple machines, it is desirable for the packets associated with a specific data flow to be processed by the same machine to minimize problems associated with packet re-ordering.

For light-weight in-region forwarding, the system preferably uses a customization to the IPsec protocol Security Parameter Index (SPI) field that allows the assigned machine to be embedded a host identifier in the SPI. In addition to host identification in the SPI, preferably IPsec packets also add a (e.g., one byte) flow ID hash to the ESP payload format. This flow ID has multiple uses, one of which is to assist in making low-cost load-balancing decisions.

Preferably, each security association (SA) is associated with a pair of security parameter indexes (SPIs), one for each end of the "tunnel." Preferably, each SA host uses its own SPI as a unique key within its local SA database, which allows it to lookup the SA and retrieve the keys used for authentication and cryptography, as well as the relevant sequence numbers for replay protection. Every IPsec packet sent begins with the SPI that the intended receiver will use to lookup the SA in its own SA database. The SPI is a 32-bit number that must be a unique identifier for the SA endpoint host that selected it, which allows an individual endpoint (i.e. the network appliance or overlay network region) to support a large number of active SAs.

When the SA is negotiated via IKE, the SPI selection preferably is limited to the range of numbers that can be represented in 25 bits. Normally, with IPSec, each 32 bit SPI would have its own SA. Here, however, only the 25 bits are used to look up the security association, and all machines in the cluster use a common security association. The upper 7 bits of every selected SPI (the host ID portion of the number) will thus be 0. When a tunnel endpoint in the load-balanced region transmits a packet to its peer, preferably it encodes its own host ID in the upper 7 bits of the SPI, resulting in a machine-specific SPI appearing in the packet. By tracking the host IDs encoded in received packets, the non-load-balanced endpoint is able to intelligently select the host ID to encode into packets it transmits such that the load balancer is able to identify the machine that should receive each packet without requiring authentication or decryption of the tunneled packet headers. When the non-load-balanced endpoint does not yet have an appropriate host ID association for the flow, preferably it uses a special host ID 127 (namely, all 1's in the upper 7 bits) to indicate this. Any special host ID may be used for this purpose.

In addition to the SPI field modification, as noted above, the system preferably adds a one-byte flow ID hash to the ESP payload. Preferably, the value is generated by hashing together the addresses and ports used by the packet. As described above, this flow ID hash cannot be used to reliably identify a connection, but it can be used by the receiver to make consistent load-balancing decisions within the load balanced region. In particular, the flow ID hash can be used by the load balancer to assign a flow to a machine when a more specific host ID has not been provided in the SPI. The flow identifier hash is not encrypted; rather, preferably it appears unencrypted in the space otherwise reserved for the encrypted ESP payload.

IPsec uses a 64-bit sequence number for replay protection. Whenever a packet is sent, the sequence number is incremented by one. According to the protocol, the receiver is supposed to track the sequence numbers it has received using a sliding window, dropping packets that are either out of window or in window but previously received. Only the low-order 32 bits of the sequence number appear in the IPsec packet, although the high-order 32 bits are included when the integrity check value is computed for the packet. In other words, the high-order 32 bits are a value that must be known by both the sender and the receiver without ever being explicitly transmitted.

This method of replay protection is problematic for a load-balanced tunnel endpoint, where a full region will act as a single logical IPsec endpoint, sharing the security association. For this reason, preferably each individual machine in the region and the non-load-balanced endpoint maintains sequence numbers that are unique for each of the host-specific SPI values. The global SPI has shared sequence numbers, but this SPI is only used for transmissions to the load-balanced region, not from it. For all machines that might need to authenticate packets that used the global SPI to function correctly, the global SPI's received sequence number periodically is synchronized within the region. As long as it is synchronized more frequently than would be required for the 32-bit low-order sequence number to wrap, all the machines in the region will know what the high order 32-bits are, thereby allowing those machines to calculate the necessary integrity check values.

The above-described load balancing technique provides significant advantages. It enables IPsec data flows to be load balanced within a particular VPN cluster yet still ensures that replay protection is enabled appropriately. With this approach, an overlay network provider (by load balancing data flows where required) is not required to provision additional capacity (e.g., on a per-tenant basis) as multiple tenants use the overlay tunnels (such as shown in FIG. 12). The technique works with all types of data flows irrespective of the underlying transport protocol (e.g., TCP, UDP, etc.).

The notion of a VPN cluster or a cluster concentrator comprises any set of cooperating machines or machine resources that receives a set of IPsec-based data flows in a single, logical tunnel, as has been described.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including distributed networking, Internet-based overlays, VPN cluster concentrators, WAN-based networking (using MPLS or otherwise), secure utilization of Internet links, and the like, all as described above.

Having described our invention, what we claim is set forth below.

The invention claimed is:

1. An apparatus operative within a virtual private network (VPN) cluster that comprises a set of machines, comprising:
   one or more hardware processors;
   computer memory holding computer program instructions executable by the one or more hardware processors and configured to:
      establish and maintain a partitioned namespace, each partition in the partitioned namespace having a set of sequence numbers uniquely associated with a given one of the set of machines in the VPN cluster to provide replay protection;
      receive a set of data flows over a single logical tunnel connected between an external computing entity and the apparatus, the set of data flows including at least one data flow having associated therewith a flow identifier hash value;
      upon being selected as a leader by a leader election routine executing across the set of machines, implement a load balancing routine with respect to a load presented by the set of data flows over the single logical tunnel, thereby load balancing the data flows over the single logical tunnel such that the load within the single logical tunnel is shared among the set of machines and the replay protection is maintained, the flow identifier hash value determining a particular one of the set of machines in the VPN cluster to receive and process the at least one data flow persistently; and
      associate a sequence number with a response generated by the particular machine, the sequence number being from the set of sequence numbers uniquely associated with the particular machine;
   wherein the apparatus is positioned to receive the set of data flows at a content delivery network (CDN) edge region located at an ingress point to the content delivery network, thereby acting as a VPN cluster concentrator with respect to the set of data flows, the apparatus providing at least one CDN-specific Transmission Control Protocol (TCP) optimization and at least one CDN-specific routing optimization together with further transport of the data flows to another CDN edge region across the content delivery network, wherein the at least one TCP optimization is one of: packet loss mitigation, and TCP buffer management.

2. The apparatus as described in claim 1 wherein the computer program instructions are further operative in response to receipt of a new data flow associated with the flow identifier hash value and the sequence number to direct the new data flow back to the particular machine.

3. The apparatus as described in claim 1 wherein the set of data flows in the single logical tunnel are each an Internet Protocol Security (IPsec) data flow.

4. The apparatus as described in claim 3 wherein the partitioned namespace is defined by a set of bits within an IPsec Security Parameter Index (SPI).

5. The apparatus as described in claim 4 wherein associating the sequence number ensures that IPsec replay protection is enabled on the response.

6. The apparatus as described in claim 1 wherein the flow identifier hash value is calculated by applying a given hash function to source and destination information defining the at least one data flow.

7. The apparatus as described in claim 6 wherein the flow identifier hash value is associated in an Encapsulating Security Payload (ESP) payload.

8. The apparatus as described in claim 1 wherein the external computing entity is a network appliance that establishes and manages the single logical tunnel.

9. The apparatus as described in claim 1 wherein the load balancing routine balances the set of data flows across the set of machines to enforce a given load balancing constraint.

10. The apparatus as described in claim 1 wherein the set of machines are physical machines or virtual machines.

* * * * *